US010834158B1

(12) United States Patent
Bourgoyne et al.

(10) Patent No.: US 10,834,158 B1
(45) Date of Patent: Nov. 10, 2020

(54) ENCODING IDENTIFIERS INTO CUSTOMIZED MANIFEST DATA (71) Applicant: Amazon Technologies, Inc., Seattle, WA (US)

(72) Inventors: David Wayne Bourgoyne, Fall City, WA (US); Amarsingh Buckthasingh Winston, Seattle, WA (US); Lei Li, Kirkland, WA (US); Yongjun Wu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 274 days.

(21) Appl. No.: 15/934,291

(22) Filed: Mar. 23, 2018

(51) Int. Cl.
H04L 9/32 (2006.01)
H04L 29/06 (2006.01)
G06T 1/00 (2006.01)

(52) U.S. Cl.
CPC .......... *H04L 65/601* (2013.01); *G06T 1/0021* (2013.01); *H04L 65/4084* (2013.01); *G06T 2201/0061* (2013.01)

(58) Field of Classification Search
CPC . H04L 65/601; H04L 65/4084; G06T 1/0021; G06T 2201/0061
See application file for complete search history.

(56) References Cited

U.S. PATENT DOCUMENTS

2014/0229976 A1* 8/2014 Ma ................... H04N 21/23439
725/32
2014/0325550 A1* 10/2014 Winograd ........ H04N 21/44236
725/19
2017/0118537 A1* 4/2017 Stransky-Heilkron ......................
G06F 21/16
2017/0353516 A1* 12/2017 Gordon ............. H04N 21/8456
2018/0176623 A1* 6/2018 Nugent ............. H04N 21/4408
2018/0352307 A1* 12/2018 Giladi ................ H04N 21/8358

* cited by examiner

Primary Examiner — Trong H Nguyen
(74) Attorney, Agent, or Firm — Weaver Austin Villeneuve & Sampson LLP (57) ABSTRACT Techniques are described for encoding information in manifest data in a way that enables identification of a version of media content. Such a capability may be used to identify dynamic content inserted into the media content for the purpose of tracking the effect of the dynamic content on user generated feedback. This capability might also be used to identify a user or device associated with a particular copy of the media content for anti-piracy purposes.

24 Claims, 8 Drawing Sheets

ENCODING IDENTIFIERS INTO CUSTOMIZED MANIFEST DATA

BACKGROUND

Consumers have an ever-increasing array of options for consuming media content, in terms of the types of media content (e.g., video, audio, text, etc.), providers of the media content, and devices for consuming the media content. Media content providers are becoming increasingly sophisticated and effective at providing media content quickly and reliably to consumers.

Media content (e.g., movies, television shows, videos, music, and electronic books) is often streamed over networks using adaptive streaming for playback on a viewer's device. Adaptive streaming techniques include generating manifest data for multiple representations (i.e., encodings) of the media content that indicate the format of requests for fragments associated with each representation. It has recently become feasible to provide different manifest data based on user or device-specific characteristics such as, for example, customer preferences or business constraints.

DETAILED DESCRIPTION

This disclosure describes techniques for encoding information in manifest data in a way that enables identification of a version of media content. In particular, these techniques involve encoding an identifier into customized manifest data by selecting certain playback options for selected durations of media content. Specifically, a pattern of playback options over the selected durations represents the identifier. A client device uses the customized manifest data to generate a customized version of the media content.

Identification of a version of media content can be for a variety of purposes. As one example, identification of a version of media content facilitates determining the particular dynamic content (e.g., advertisement, pre-roll, etc.) that is inserted into media content, such as for tracking the effect of the particular dynamic content on user generated feedback. As another example, identification of a version of media content facilitates determining the identity of a user or device associated with a particular copy of the media content, such as for anti-piracy purposes. An example will be instructive.

Figure 1:
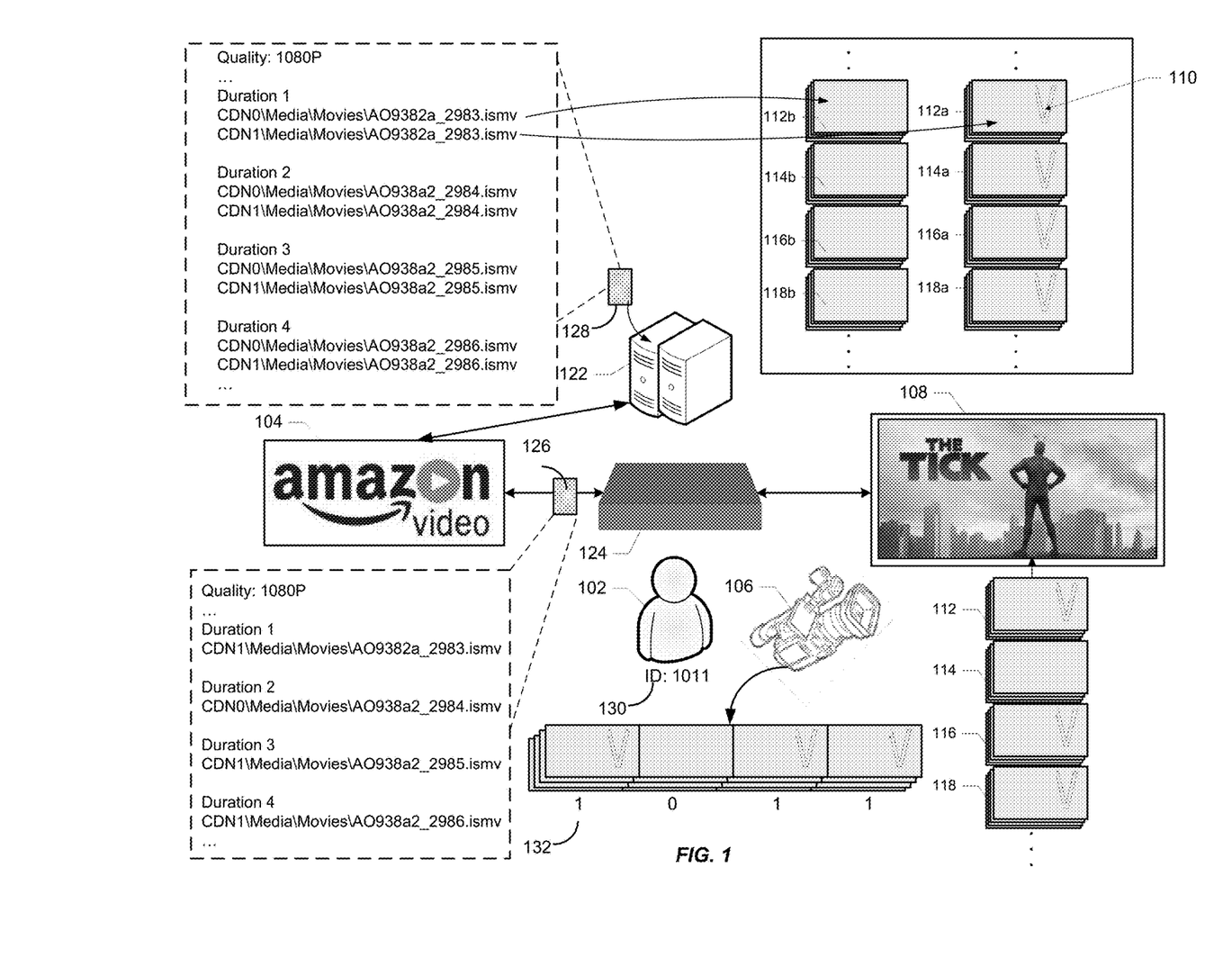
FIG. 1 illustrates an example of using customized manifest data for content source identification.

Referring to FIG. 1, assume that a user 102 of the Amazon Video service 104 requests a stream of the first episode of Amazon's series "The Tick" for the purpose of unauthorized distribution. As part of the initial request, user 102 or device 124 provides identifier 130, such as a user ID number illustrated as "1011" in FIG. 1. The Amazon Video service 104 generates customized manifest data 126 based on identifier 130 and provides customized manifest data 126 to user 102's Fire TV streaming media player 124. Streaming media player 124 generates requests for content fragments of "The Tick" based on customized manifest data 126, and decodes the content fragments received from media server 122. During playback of the decoded content fragments, user 102 records the episode using an HD camera 106 focused on his 4K UHD flat screen television 108.

However, unbeknownst to user 102, a pattern of version information 110 is encoded into at least some of the content fragments (e.g., 112-118) identified by customized manifest data 126 and is recoverable as a version pattern 132 that can identify user 102 as the source of the recorded episode. Version information 110 can be imperceptible to the human eye (as represented by the dashed lines), or can be visible but not distinguishable (a flower in the background rendered in a particular color).

The pattern of version information 110 across content fragments, such as the presence or absence of version information 110, indicates one of a limited number of versions of each content fragment. For example, for a content fragment 112 corresponding to a particular 2 second segment, or duration, of "The Tick," master manifest data 128 includes a reference to a first version 112a that includes the version information 110 and a second version 112b that does not include the version information 110. FIG. 1 visually illustrates the contents of master manifest data 128 by indicating for a particular video quality of 1080P, four particular media content segments, labeled as Duration 1-4, with each duration at 1080P including two URLs corresponding to different edge servers having a root URL address of either "CDN0" or "CDN1." FIG. 1 also visually illustrates that each depicted URL in master manifest 128 corresponds to a particular content fragment, visually abstracted in FIG. 1 as a group of video frames stacked together. Each content fragment corresponds to a portion of media content streamed by a client device for playback on a display, and version information 110 corresponds to the version of a content fragment, as opposed to a version of a particular video frame within the content fragment.

As an example, for Duration 1, a content fragment from the "CDN0" edge server corresponds to a first version 112a, and a content fragment from the "CDN1" edge server corresponds to a second version 112b. It should be appreciated that different versions of a particular content fragment may be stored on the same edge server, and that the URLs for the content fragment versions may differ in ways other than in the example described herein.

Based on identifier 130 for user 102, such as login information, media server 122 uses master manifest data 128 to generate customized manifest data 126 that only includes the URL for the first version 112a, which has version information 110. For a subsequent content fragment corresponding to the next 2 second duration of "The Tick," customized manifest data 126 only includes the URL for the second version 114b, which lacks version information 110. For the next two content fragments, customized manifest data 126 only includes the URLs for the first version, as represented by the "CDN1" edge server root address. Thus, customized manifest in 126, over Durations 1-4, includes the pattern "CDN1," "CDN0," "CDN1," "CDN1," in the corresponding URLs, which represents the identifier "1011." As a result, the identifier "1011" is encoded into the version of media content played back by streaming media player 124.

When user 102 later posts the unauthorized recordings on YouTube, the particular version associated with each 2 second portion of "The Tick" can be determined by comparison with a reference version of the media content, image processing of the posted content, or a combination of both. For example, all 2 second portions of the reference version of "The Tick" may include no version information (e.g., content fragments 112b-118b), therefore video frame comparisons between a reference content fragment and a posted content fragment can indicate the presence or absence of version information 110. Based on the recovered version pattern 132 of the content fragment versions (i.e., the particular alternating sequence of watermarked and non-watermarked content fragments), user 102's identifier 130 (i.e., "1011") can be associated with the source of the unauthorized content.

It should be noted that even though media server 122 stores two content fragments, 112a and 112b, each one corresponding to a different version for one duration of the media content, streaming media player 124 only downloads the content fragment corresponding to the particular version indicated in the customized manifest data 126, therefore there is no increase in storage requirements at the playback device.

It should further be noted that by encoding the identifier into customized manifest data 126 rather than the media content itself, the number of users that may be uniquely identified may be significantly larger than the number of versions of content fragments. Therefore, despite using backend operations, e.g., prior to encoding, certain implementations of the disclosed techniques may achieve increased granularity in user identification without impractical increases in content fragment storage requirements at a media server, edge server, or playback device. The techniques described herein may also avoid the necessity of modifications to playback devices, e.g., to perform client-side watermarking.

Figure 2:
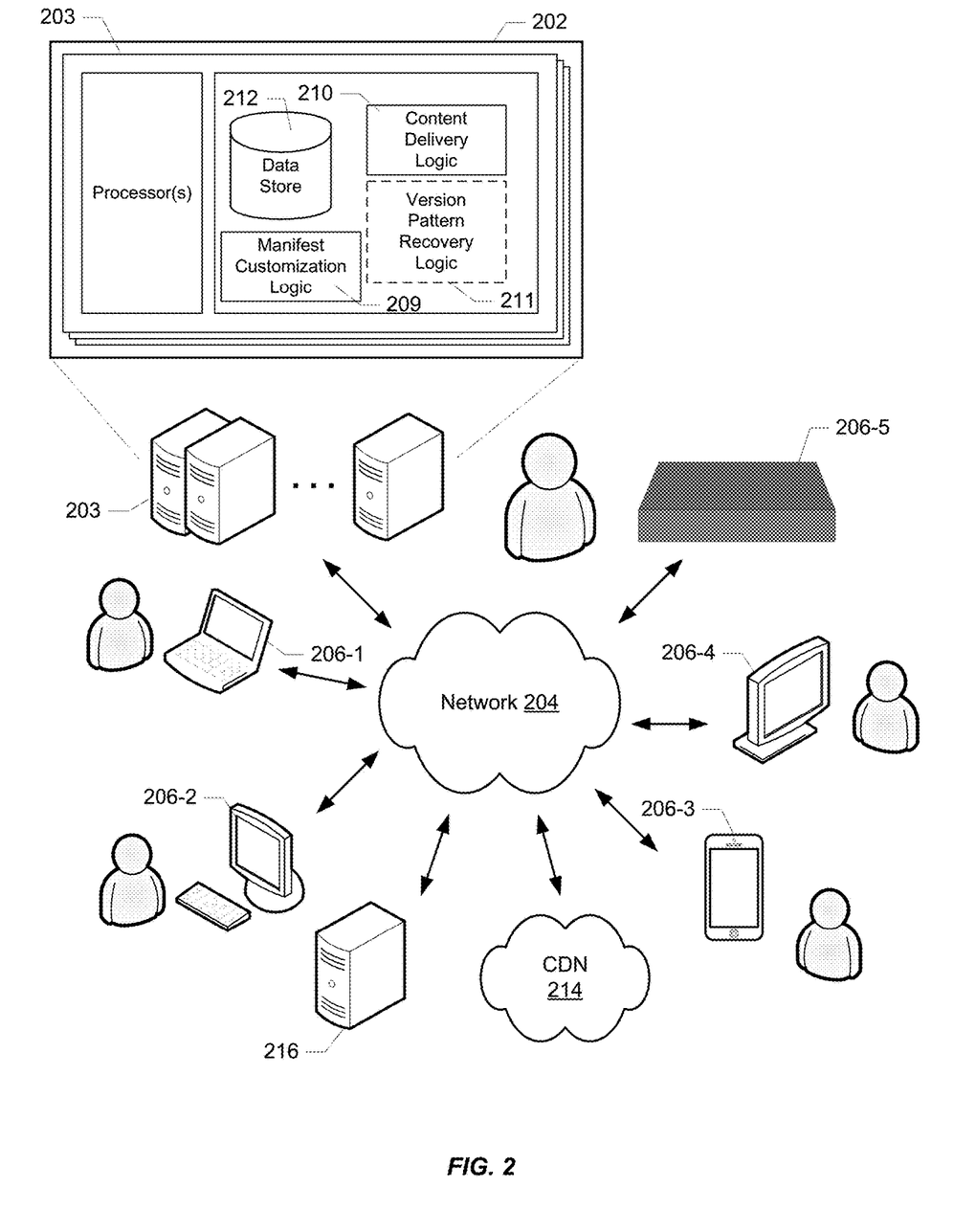
FIG. 2 illustrates an example of a computing environment in which customized manifest data can be used for identifying the source of a version of media content.

FIG. 2 illustrates an example of a computing environment in which a video content service 202 (e.g., Amazon Video service 104) provides video content via network 204 to a variety of client devices (206-1 through 206-5) in accordance with the techniques described herein. As should be appreciated, the video content may be downloadable content, streaming content, video on demand, live/broadcast video, etc. Content service 202 may conform to any of a wide variety of architectures such as, for example, a services platform deployed at one or more co-locations, each implemented with one or more servers 203. Network 204 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, and so on. Client devices 206 may be any suitable device capable of connecting to network 204 and consuming content provided by service 202. Such devices may include, for example, mobile devices (e.g., cell phones, smart phones, and tablets), personal computers (e.g., laptops and desktops), set top boxes (e.g., for cable, satellite, and online systems), smart televisions, gaming consoles, wearable computing devices (e.g., smart watches or smart glasses), etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 202. Alternatively, such resources may be independent of content service 202, e.g., on a platform under control of a separate provider of computing resources with which content service 202 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 202 is described as if it is integrated with the platform(s) that provides the content to client devices. However, it will be understood that content service 202 may provide access to content in conjunction with one or more content delivery networks (e.g., CDN 214) that may or may not be independent of content service 202. In addition, the source of the content may or may not be independent of content service 202 (e.g., as represented by content provider server 216). The range of variations known to those of skill in the art are contemplated to be within the scope of this disclosure.

Content service 202 may also include a variety of information related to the video content (e.g., other associated metadata, master manifest data, customized manifest data) in data store 212 to which service 202 provides access to during, for example, content delivery operations, manifest customization operations, and/or version pattern recovery operations. Alternatively, such information about the content, as well as the content itself may be provided and/or hosted by one or more separate platforms, e.g., CDN 214.

As one example, data store 212 stores master manifest data 128 shown in FIG. 1. Master manifest data 128 includes information on all of the content fragments for playback of the first episode of "The Tick," such as, for example, at the 4K UHD, 1080p, 720p at 5 megabits per second (Mbps), 720p at 7.5 Mbps (e.g., providing a higher frame rate than the 720p at 5 Mbps quality level), and 576i video quality levels (or bitrates). That is, master manifest data 128 provides content fragments for encodings of the media content at five different quality levels at several resolutions as well as possible bitrates within the resolutions (e.g., the 720p resolution at 5 Mbps and 7.5 Mbps). For clarity purposes, FIG. 1 only depicts URLs for certain durations for the 1080P quality in master manifest data 128.

For certain durations of the media content, master manifest data 128 also indicates content fragments corresponding to a first version (e.g., 112a) and a second version (e.g., 112b), with each version having the five different quality levels at several resolutions/bitrates as previously described. As an example, for Duration 1, a content fragment from the "CDN0" edge server corresponds to first version 112a, and a content fragment from the "CDN1" edge server corresponds to second version 112*b*.

Manifest customization logic 209 generates customized manifest files that can be provided to viewer devices for playback of a particular version of media content. For example, referring to FIG. 1, manifest customization logic 209 generates customized manifest data 126 from master manifest data 128 based in part on data stored in data store 212. Data store 212 stores data such as identifiers provided by a user or device, network conditions (e.g., network bandwidth), playback history, geographic location, user preferences, constraints (e.g., legal, business, etc.) and other data that can be used to select playback options for selected durations of media content from master manifest data 128. For example, based on an identifier that corresponds to a particular value (e.g., the binary string "1011" as shown in FIG. 1) for an attribute (e.g., a user account number), manifest customization logic 209, for certain durations of the media content, selects from master manifest data 128 a particular pattern of content fragment versions that encodes the identifier. The particular pattern of content fragment versions is included in customized manifest data 126 and provided to a client device associated with the encoded identifier.

It should also be noted that implementations are contemplated in which, in addition to content delivery logic 210 (which facilitates various aspects of content delivery to client devices 206, including delivery of customized manifest data), content service 202 may include logic that facilitates at least some aspects of version pattern detection as described herein (e.g., as represented by version pattern recovery logic 211). For example, such logic might be configured to compare target video content to reference video content, filter the target content, or both, to detect version information. Such logic might also be configured to modify either the reference or target content for facilitating comparisons between the reference and target content, e.g., by making resolution, spatial and/or temporal adjustments that compensate for timing offsets, perspective distortion, and image capture artifacts created by HD camera 106 filming the display of television 108.

As will be appreciated and as indicated by the dashed outline, version pattern recovery logic 211 need not be closely coupled with the delivery of content as its operation typically occurs remotely in time relative to content delivery, e.g., after the distribution or posting of unauthorized content has been detected.

It should be noted that, while logic 209, 210 and 211, and data store 212 are shown as integrated with content service 202, implementations are contemplated in which some or all of these operate remotely from the associated content service, and/or are under the control of an independent entity. From these examples, those of skill in the art will understand the diversity of use cases to which the techniques described herein are applicable.

Figure 3:
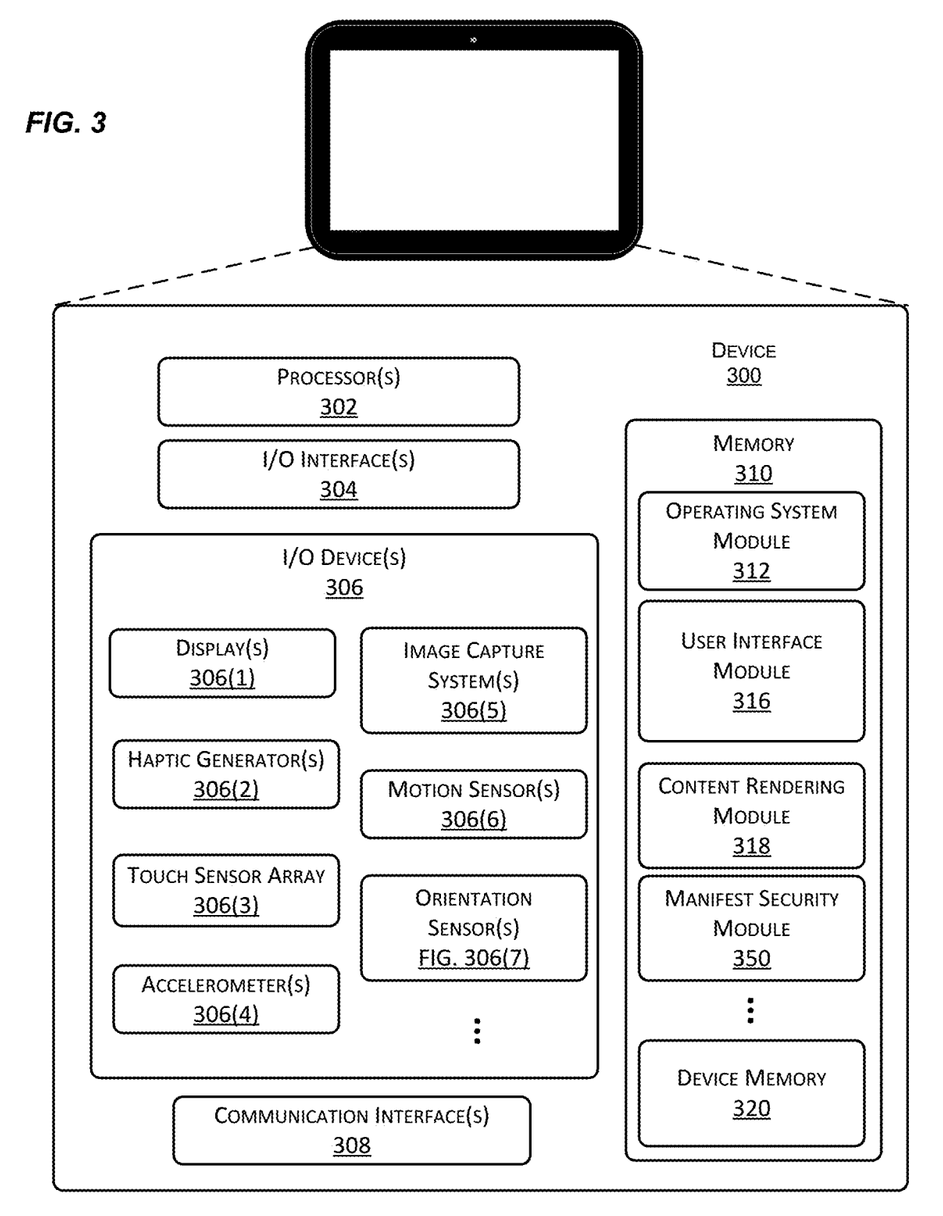
FIG. 3 is simplified block diagram of a client device in which various implementations may be practiced.

A block diagram of an example of a device 300 suitable for use with various implementations is shown in FIG. 3. Device 300 may include a wide variety of device types. It should be appreciated that the presently disclosed techniques do not require device 300 to implement the logic for introducing and/or recovering content fragment version patterns in hardware, software, and/or firmware. It should further be appreciated that the presently disclosed techniques are compatible with client-side watermarking capabilities that may be present in device 300.

Returning to the example of FIG. 3, device 300 is depicted as a tablet device and includes one or more single or multi-core processors 302 configured to execute stored instructions (e.g., in device memory 320). Device 300 may also include one or more input/output (I/O) interface(s) 304 to allow the device to communicate with other devices. I/O interfaces 304 may include, for example, an inter-integrated circuit (I2C) interface, a serial peripheral interface (SPI) bus, a universal serial bus (USB), an RS-232 interface, a media device interface (e.g., an HDMI interface), and so forth. I/O interface(s) 304 is coupled to one or more I/O devices 306 which may or may not be integrated with client device 300.

Device 300 may also include one or more communication interfaces 308 configured to provide communications between the device and other devices. Such communication interface(s) 308 may be used to connect to cellular networks, personal area networks (PANs), local area networks (LANs), wide area networks (WANs), and so forth. For example, communications interfaces 308 may include radio frequency modules for a 3G or 4G cellular network, a WiFi LAN and a Bluetooth PAN. Device 300 also includes one or more buses or other internal communications hardware or software (not shown) that allow for the transfer of data and instructions between the various modules and components of the device.

Device 300 also includes one or more memories (e.g., memory 310). Memory 310 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 310 provides storage for computer readable instructions, data structures, program modules and other data for the operation of device 300. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 310 includes at least one operating system (OS) module 312 configured to manage hardware resources such as I/O interfaces 304 and provide various services to applications or modules executing on processor(s) 302. Memory 310 also includes a user interface module 316, a content rendering module 318, and other modules. Memory 310 also includes device memory 320 to store a wide variety of instructions and information using any of a variety of formats including, for example, flat files, databases, linked lists, trees, or other data structures. Such information includes content for rendering and display on display 306(1) including, for example, any type of video content. In some implementations, a portion of device memory 320 may be distributed across one or more other devices including servers, network attached storage devices, and so forth.

In some implementations, customized manifest data 126 is encrypted by, for example, media server 122, and is decrypted at device 300 in a manifest security module 350 that prevents a user of device 300 from seeing variations in the sources of content fragments and/or modifying the contents of customized manifest data 126. Such secure handling of customized manifest data 126 can help counter circumvention or collusion by users attempting to generate unauthorized copies of media content. In certain implementations, manifest security module 350 can scan customized manifest data 126 to determine if an identifier encoded into customized manifest data 126 differs from a corresponding identifier associated with device 300 or a user of device 300. In the event of a mismatch, which may indicate the attempted use of an unauthorized modification or distribution of particular customized manifest data, device 300 can deny playback of media content based on the particular customized manifest data.

It will be understood that device 300 of FIG. 3 is merely an example of a device with which various implementations enabled by the present disclosure may be practiced, and that a wide variety of other devices types may also be used (e.g., devices 206-1 to 206-5). The scope of this disclosure should therefore not be limited by reference to device-specific details.

Figure 4:
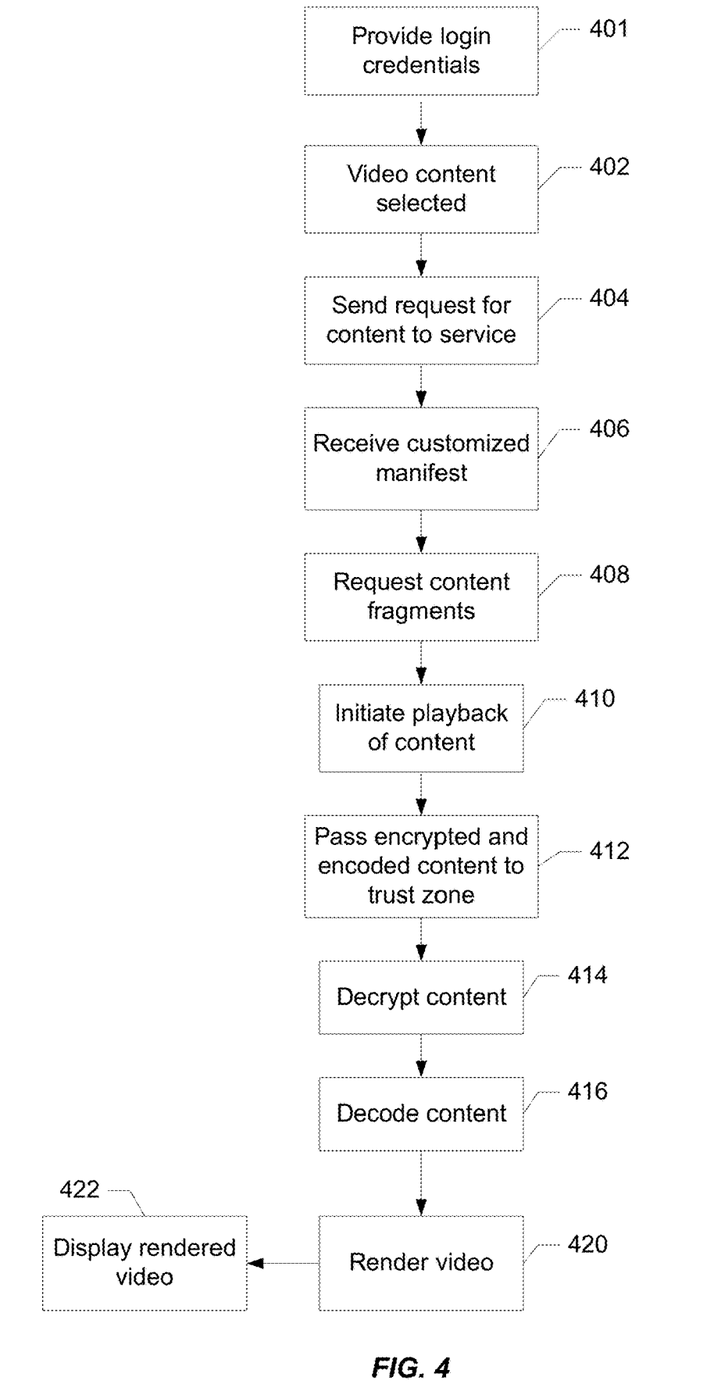
FIG. 4 is a flowchart illustrating the generation of a version of media content based on customized manifest data.

A particular implementation of the generation of customized manifest data by a media server and the generation of a corresponding version of media content by a client device according to the customized manifest data is illustrated in the flow chart of FIG. 4. When a user wants to connect with a content service using a client device, the connection may be achieved through some kind of login process to the content service in a user interface presented on the client device. Content playback is provided, for example, via a resident media player, web browser, or mobile app on the client device.

The video content may be delivered using an adaptive bit rate streaming technique such as, for example, MPEG-DASH (Dynamic Adaptive Streaming over HTTP), Apple's HLS (HTTP Live Streaming), or Microsoft's Smooth Streaming, to name a few representative examples. Furthermore, the video content may involve stitching across different streaming standards, such as movie content using the Smooth Streaming standard with dynamically inserted advertisements that use the DASH standard. The video content may be encoded using any of a variety of including, for example, MPEG-1, MPEG-2, MPEG-4 Part 2, VC-1, H.263, VP8, VP9, Daala, H.264, and H.265 (HEVC). It should be noted that the techniques described herein are compatible with a wide range of content services, media players, DRM systems, encryption technologies, streaming technologies, and codecs, the details of which are known to those of skill in the art. The nature and operation of these technologies will therefore not be described in detail to promote clarity.

Referring now to FIG. 4, a client device provides an identifier, such as login credentials, to access a content service (401). Following authentication of the login credentials, when video content is selected in a user interface on a client device (402), a request for the content is sent to the corresponding content service (404).

The content service provides the client device with the information the client device needs to stream the content (406). This may include, for example, DRM licenses, a decryption key, content metadata, and customized manifest data indicating where the client can request the content fragments of the selected video content at various resolutions, languages, subtitle options, audio profiles, and so forth. For example, referring to FIG. 1, media server 122 generates customized manifest data 126 to allow for media player 124 to view the media stream. The customized manifest data (e.g., one or more markup files, other types of data structures, data provided over an API, etc.) provides playback options for the media stream by providing metadata that allows media player 124 to generate properly formatted requests for specific content fragments of the media content. Media player 124 uses customized manifest data 126 to generate a uniform resource locator (URL) directed to media server 122 that includes, for example, a query string indicating the specific content fragment to be provided by media server 122. As will be appreciated, such a request may be directed to a server other than media server 122, or a plurality of media servers. The URL is formatted based on a schema indicated by the customized manifest data 126. For example, the schema may be represented as a template describing an HTTP request where different strings within the HTTP address specify parameters such as the host, channel, quality level, fragment index, byte range, or time range being requested. One example of a request conforming to a schema is: "CDN1\Media\Event\AO9382\Cap10\Frag5.isml." The request specifies a host with "CDN1\media," a channel and specific media content with "\vent\AO9382," a quality level with "\Cap10," and a content fragment index with "\Frag5.isml."

In certain implementations, manifest data is customized based on an identifier associated with the user or device requesting the video content, such as credentials provided during login, a hardware device identifier, IP address information, a randomly assigned value, and so forth. In some implementations, manifest data is customized based on a combination, such as a hash, of multiple values.

Figure 5A:
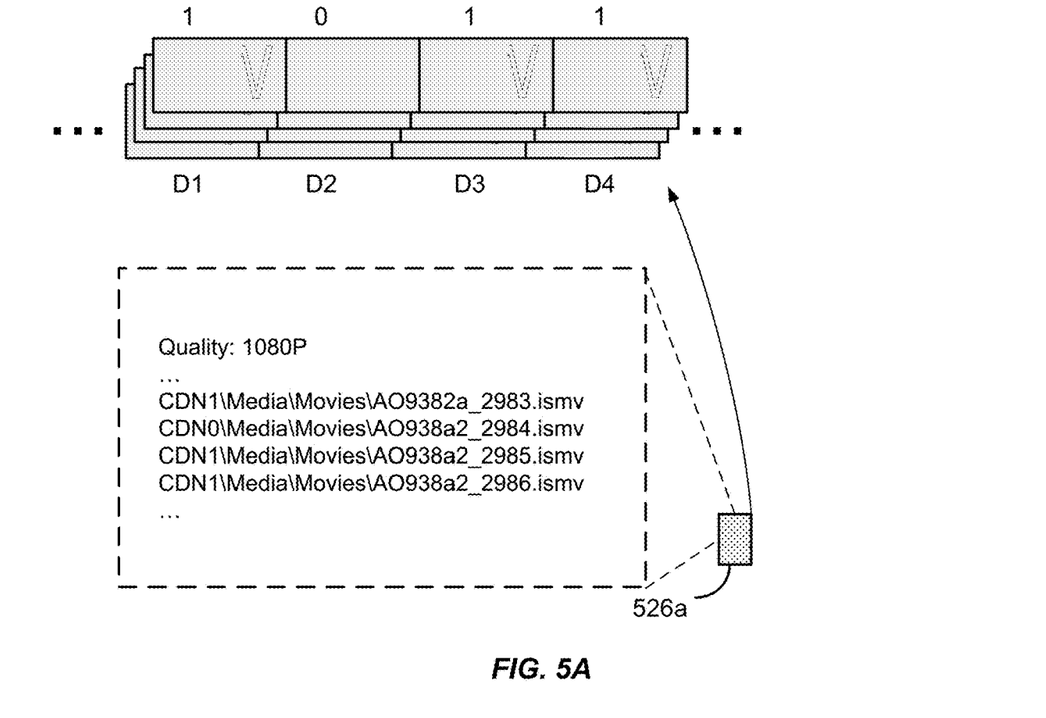
FIGS. 5A-D illustrates examples of encoding identifier values into a pattern of content fragment versions in customized manifest data.
Figure 5B:
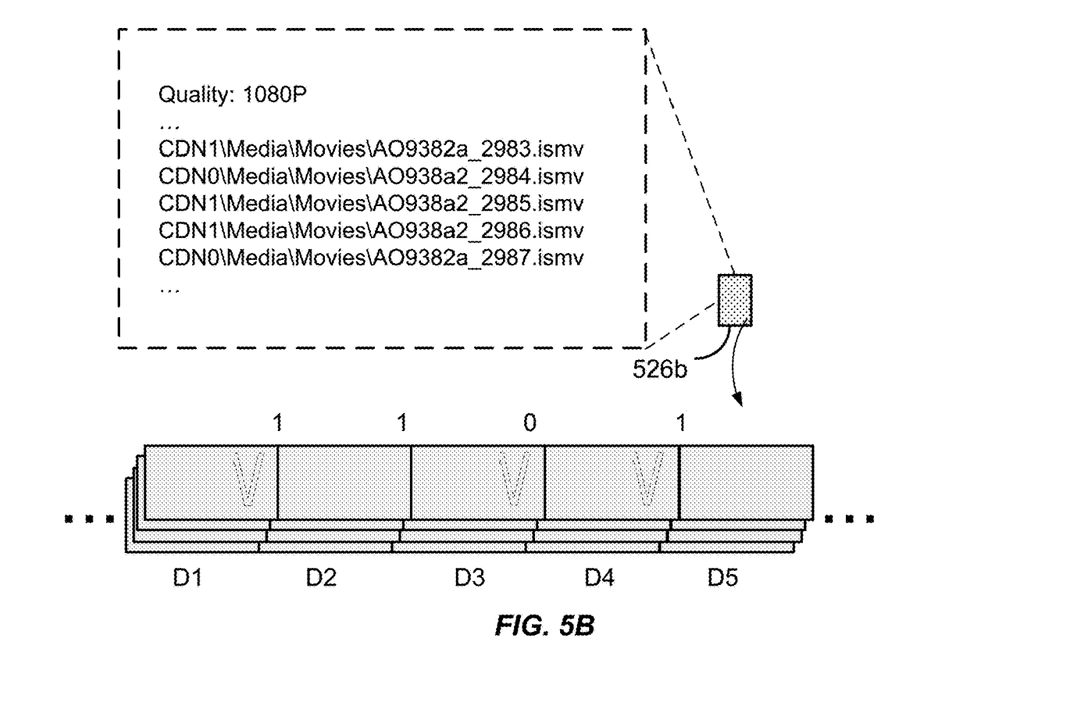
Figure 5C:
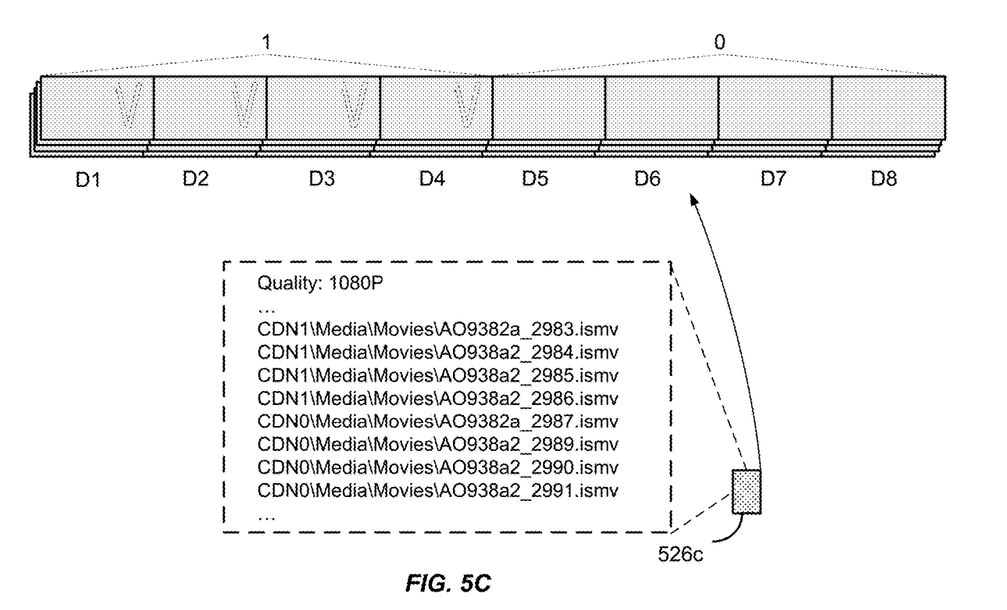
Figure 5D:
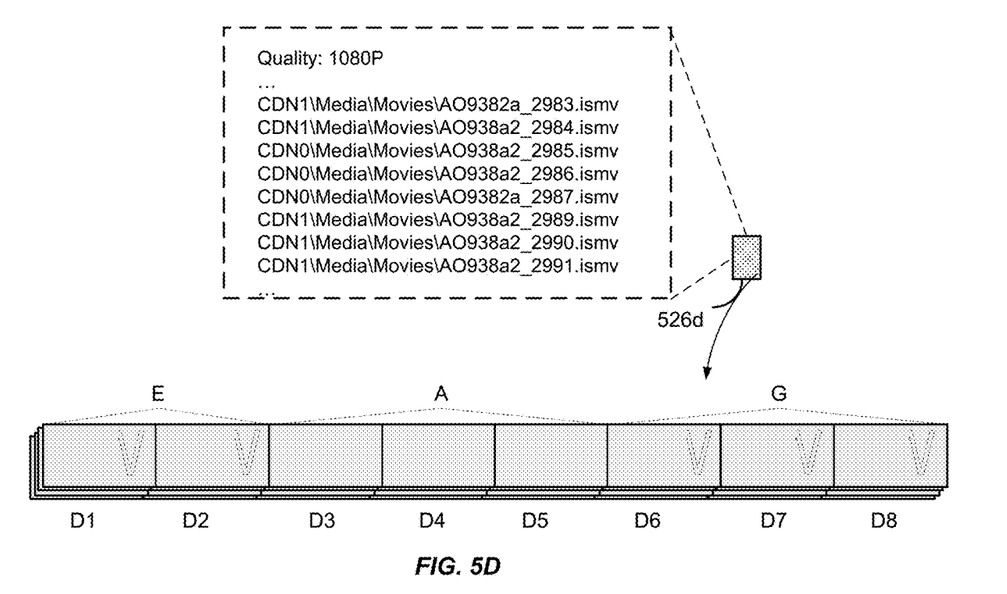

Referring to FIGS. 5A-D and FIG. 1, manifest data is customized by encoding information such as an identifier. In contrast to embedding a text string representing the identifier into, for example, header metadata or using a markup tag, the identifier is encoded into customized manifest data by selecting a pattern of playback options for selected durations, or segments, of media content. For example, FIG. 5A depicts customized manifest data 526a indicating URLs for a set of four durations of media content, D1-D4. For each duration of media content, media server 122 can store two versions of content fragments corresponding to each duration. For instance, the first duration corresponds to two content fragments, a first version (v1) with version information represented by, for example, an overlay, and a second version (v2), for example, without an overlay. Similarly, the second through fourth durations each also correspond to two content fragment versions. It should be appreciated that there are 16 (2^4) permutations of content fragment versions across the four durations (e.g., [v1, v1, v1, v1], [v1, v1, v1, v2], . . . [v2, v2, v2, v2,]), which allows discrimination of 16 different user accounts, and that media server 122 stores two different versions (v1, v2) for each of the four durations. It should further be appreciated that not every duration in particular media content is required to have multiple content fragment versions, therefore the increase in storage requirements associated with the disclosed techniques is not required to be double the size of the media content.

The identifier in a particular customized manifest data can be encoded as a pattern of content fragment versions in a wide variety of techniques. For example, as depicted in FIG. 5A, in customized manifest data 526a, each duration corresponds to a binary value (e.g., "1" for a content fragment stored at an edge server at a URL starting with "CDN1," which includes version information represented by having an overlay, and "0" for a content fragment stored at an edge server at a URL starting with "CDN0," which includes version information represented by having no overlay), and an ordered group of durations (e.g., [d1, d2, d3, d4]) corresponds to a string of binary values (e.g., [1011]). The string of binary values can correspond to, for example, an ASCII representation of a string of alphanumeric characters indicating the hardware device ID, a hash of the user credentials, etc. FIG. 5A visually illustrates the version pattern across a sequence of content fragments, each content fragment being depicted as a group of stacked video frames with or without the overlay, corresponding to the resulting version of the media content based on a client device using customized manifest data 526a to stream the media content.

In some implementations, differential coding can be used. For example, as depicted for the customized manifest data 526b in FIG. 5B, a change in the content fragment version (e.g., from overlay to no overlay, or vice versa) between two different durations can be used to indicate a particular binary value 1, and the lack of change the opposite binary value 0.

In certain implementations, a particular binary value is represented by multiple fixed consecutive durations. For example, as depicted for the customized manifest data 526c in FIG. 5C, each set of four durations of identical version information (e.g., 1 for four content fragments with overlay, 0 for four content fragments without overlay) corresponds to a particular binary value. The sequence of multiple four-duration intervals corresponds to a particular binary string.

In various implementations, a particular value is represented by variable length consecutive durations of the same version information. For example, as depicted for the customized manifest data 526d in FIG. 5D, each set of consecutive durations of the same version (e.g., two with overlay, three without overlay, three with overlay) can correspond to a particular Latin alphabet character, with statistically more common characters using fewer consecutive durations.

It should be appreciated that the above encoding pattern techniques are examples, and other information encoding techniques as known in the art can be used. In certain implementations, encoding techniques can be combined (e.g., differential and fixed length coding). It should be appreciated that forward error correction (FEC) techniques can be incorporated to improve robustness against noise, dropped packets, etc. It should also be noted that multiple identifiers can be encoded into a particular customized manifest data, such as both a hardware ID and a hash of login credentials.

It should be noted that the number of durations used for encoding may be any number n that is less than or equal to the number of durations of the media content, the durations do not necessarily need to be sequential, the number of versions for a particular duration may be any number (e.g., binary, ternary, quaternary, etc.), and the number of versions may vary across durations (e.g., binary for a first duration, ternary for a second duration, etc.).

In some implementations, the number of durations represented in customized manifest data and the particular durations used for encoding may vary for different users. For example, for a user who has previously been suspected or confirmed as the source of unauthorized content, the number of durations in which a version pattern is encoded across may be lengthened and/or repeated to increase the robustness of the encoded identifier against noise, intentional manipulation, detection errors, etc. As another example, by choosing different groups of durations for encoding different user identifiers, users who are colluding may be identified. For instance, an unauthorized copy of content may be generated cooperatively by two users, with the first user generating the first half of the content, and the second user generating the second half of the content. If the identifier for the first user is encoded in, for example, the first four durations of the movie, and the identifier for the second user is encoded in, for example, the last four durations of the movie, an unauthorized copy of the movie corresponding to the two halves spliced together includes the identifiers for each user, thereby allowing identification of both sources.

In certain implementations, the use of customized manifest data, and the values of parameters, such as, for example, the number of durations and the particular durations used, may be dynamic. For example, for a first episode of an episodic media content requested by a user, media server 122 does not generate customized manifest data 126. For a user that continues to stream more than a certain number of subsequent episodes in a particular time window, possibly suggesting bulk downloading for the purposes of distribution, media server 122 begins to provide customized manifest data 126 that encodes an identifier for the user. As the rate at which additional episodes are streamed drops below a certain threshold, or a "freshness" factor for the media content indicative of popularity and/or priority for anti-piracy protection drops below a threshold, media server 122 may no longer generate customized manifest data 126 for the media content. The inputs for the dynamic enabling/disabling and parameter modification for personalizing manifest data may be from a wide variety of sources, including analysis of social media posts, popularity of related media content, publicity trends for cast members in the media content, etc. It should be noted that by disabling or reducing the number of durations with multiple versions for media content requiring less anti-piracy protection, storage requirements, such as at a cache in an edge server, can be allocated to other content.

It should further be appreciated that use of the term content fragment version is not limited to a single representation for the content fragment version. For example, for a particular content fragment version (e.g., a content fragment that includes an overlay), customized manifest data 126 can include URLs for requesting a 1080P, 720P, and UHD representation for the particular content fragment version for a particular duration of media content. Regardless of which representation is selected by adaptive streaming logic implemented at the media server 122 and/or media player 124, such as switching between different video resolutions based on network bandwidth conditions for different durations of the media content, content fragment version information can be recovered for source identification purposes. It should be noted that representations for a particular content fragment version is not limited to video resolution. For example, audio language, audio codec, subtitles, or pixel ratio, are nonlimiting examples of parameters that may vary between representations and/or adaptation sets (e.g., groups of representation) associated with a content fragment version.

Returning to FIG. 4, the client device then requests content fragments of the video content using the customized manifest data received from the content service (408).

When client device begins playback of the stream of the content fragments (410), the compressed and encrypted video is passed to a secure video processing environment, e.g., a DRM "trust zone," operating on the client device (412). In the secure processing environment, the video is decrypted (414), e.g., by decryption module 352, and decoded (416), e.g., by decoding module 354. As mentioned above, the type of encryption and the codec employed are not particularly relevant to the techniques enabled by the present disclosure. It should be appreciated that the techniques enabled by the present disclosure are applicable to content that is not encrypted and/or not encoded (e.g., raw or uncompressed), such as in a content production studio environment.

The sequence of decrypted and decoded video frames are then rendered (420), and passed to the display associated with the client device for presentation (422).

According to a particular class of implementations, version information (e.g., version information 110 of FIG. 1) for a content fragment is introduced by compositing the pixel information of the video frames (i.e., pre-encoded or decoded video frames) of the content fragment with opacity information encoded in a largely transparent overlay. Effectively, the pixel transparencies of the overlay are manipulated in a manner that encodes the version information. Such version information may be represented, for example, in the alpha channel of the red-green-blue (RGB) color space or model, referred to as RGBA (where the "A" represents the alpha channel). According to such an approach, the overlay is composited pixel by pixel with the pre-encoded or decoded video frame. If the alpha channel for a given pixel in the overlay has a value corresponding to 0%, that overlay pixel is completely transparent and so only the information of the corresponding pixel of the video frame is preserved in the resulting composited frame. By contrast, any non-zero value in the alpha channel for an overlay pixel results in a pixel in the composited video frame that correspondingly obscures or alters the information of the corresponding pixel of the video frame.

It is desirable in some implementations that the overlay representing version information be imperceptible to the human eye (often referred to as digital steganography). Not only does that make it more difficult for content pirates to detect, alter, remove, or otherwise defeat the overlay, it ensures that the quality of the video content being marked with a version identifier is not significantly degraded. However, it should be noted that implementations are contemplated in which the overlay is perceptible to varying degrees. Not only might this serve to make the overlay more robust against noise, it might also serve as an explicit reminder to users that the unauthorized copying and distribution of the content is prohibited.

Content fragment version information may be integrated within the video frames in a content fragment in a variety of ways. For example, version information for the content fragment may be introduced in every frame of the content fragment. Alternatively, version information for the content fragment may be introduced in only some subset of the frames. In another example, the entire overlay representing version information for the content fragment may be introduced each time into a video frame. Alternatively, only some portion of the overlay might be introduced in each of a sequence of frames within the content fragment (which need not be consecutive) such that the complete overlay may be reconstructed using some combination of the information from the sequence of frames within the content fragment. In another example, the version information for the content fragment may be derived by integrating over different locations over different frames of the content fragment. A wide variety of other variations will be appreciated from these examples. For example, the overlay might be some kind of a symbol or sequence of symbols over the video frames within a content fragment. Such information might be encoded using, for example, probabilistic codes such as those developed by Gabor Tardos (Tardos codes). However, any of a variety of suitable techniques for encoding this type of information across the video frames of a content fragment may be employed. The version information for a content fragment in any given frame in the content fragment might represent some portion of the symbol or code (e.g., a random sample) such that, even if perceptible or otherwise detectable, it appears to be random noise. However, by combining contributions over many frames, the original symbol(s) can be recovered to determine the version information for the content fragment.

The nature of the version information from which a content fragment version may be recovered or reconstructed may vary considerably depending on the implementation. In some implementations, the overlay on the video frames strikes an appropriate balance between being robust and being unobtrusive. That is, it is desirable that the pattern be sufficiently robust to survive the various transformations that occur when video is captured, due to subsequent transcoding, intentional distortions to defeat watermarking, etc. On the other hand, as mentioned above, it may also be desirable that the pattern not be readily detectable to the human eye so as not to interfere with the user experience or be detected and defeated by unauthorized distributors.

In a certain class of implementation, version information is not represented by an overlay. Rather, the reference content identifies multiple content fragment versions for comparison with the target content. For example, for a particular duration of media content, there may be subtle differences in the camera perspective across two content fragment versions. The target content can be correlated with content fragments corresponding to each of the two camera perspectives, and the content fragment with the highest correlation coefficient indicates the version information in the target content.

In a class of implementations, customized manifest data 126 is generated but not provided to media player 124. For example, based on the received identifier value, media server 122 generates and locally stores customized manifest data 126 associated with media player 124. Media server 122 instead provides to media player 124 master manifest data 128, or a subset of master manifest data 128 that does not encode the received identifier value (e.g., all content fragments belong to one version), in response to a request for content from media player 124. When media player 124 transmits a request to media server 122 for a content fragment referenced in the received master manifest data 128, media server 122 uses the locally stored customized manifest data 126 to determine whether to redirect the request to a different content fragment version. For example, for a two second duration corresponding to seconds 8-10 of media content, media player 124 may request version one of the corresponding content fragment. However, media server 122, upon referencing customized manifest data 126 indicating that media player 124 should receive version two of the content fragment (e.g., which may include an overlay, be a censored blackout frame, etc.), redirects the request for version one by, for example, replacing the URL. Subsequent durations can be redirected or not redirected based on the pattern version encoded into customized manifest data 126. It should be appreciated that storage of customized manifest data 126 and the redirection logic can be at servers other than media server 122, such as an edge server of a CDN. In some scenarios, using customized manifest data stored at media server 122 to perform content fragment redirection in accordance with particular version patterns can improve caching efficiency at edge servers due to the sharing of default manifest data across multiple users.

Figure 6:
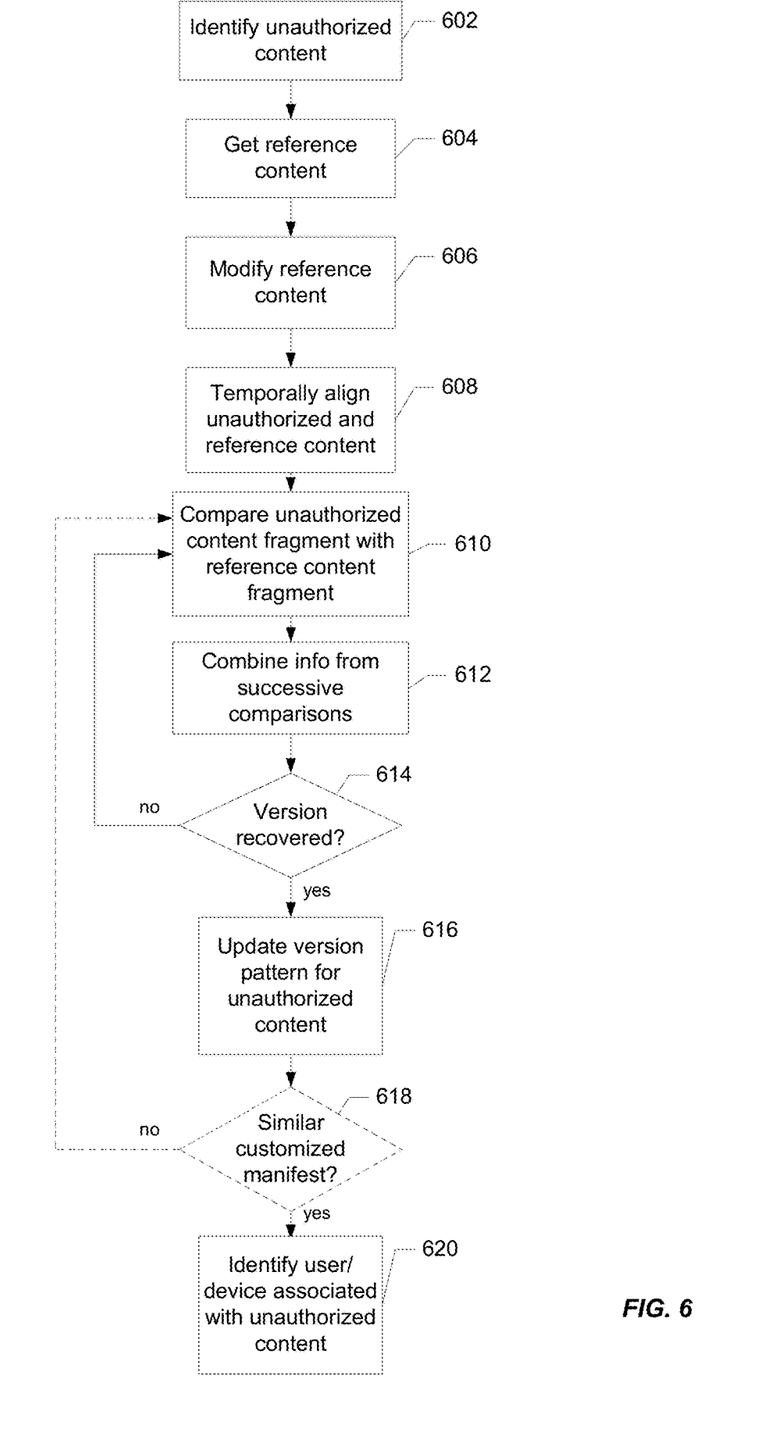
FIG. 6 is a flowchart illustrating the identification of a source for a version of media content generated based on customized manifest data.

According to various implementations, the user or device associated with a particular copy of video content is identified by detecting or deriving a corresponding pattern of content fragment versions in the copy of the video content. The content fragment version is recovered by determining the difference (e.g., by subtraction or other form of comparison) between frames of the content fragments of the target content and corresponding frames of the content fragments of the reference content. FIG. 6 is a flowchart illustrating pattern recovery according to a particular implementation.

An unauthorized copy of video content is identified (602), e.g., posted on social media, a video sharing site, retrieved from a node in a peer-to-peer network, etc. A reference video corresponding to the unauthorized copy is obtained (604). This might be responsive to the identification of the unauthorized video content, such by human identification, metadata processing, or OCR processing of text in the title credits, or might be done at some earlier or later time. The reference video might be derived from a digital master file, so the reference video might need to be modified (606) before comparison to the unauthorized copy. For example, if the digital master is a 4K UHD video it may not be readily comparable to a 1080p HD copy or a 720p SD copy. So, for a given comparison, the reference video may need to be scaled to a comparable resolution. Spatial alignment (e.g., by cropping or resizing) might also be required in that the unauthorized video might be cropped or resized relative to the reference. Perspective alignment might also be required in that the unauthorized video might be skewed relative to the reference due to the geometric arrangement of the recording device and the display device.

The manner in which the reference video or unauthorized video should be modified or adapted may be determined based on analysis of the unauthorized content. For example, the resolution of the unauthorized content may be determined by the number of pixels represented in one or more frames of the unauthorized content. Spatial alignment and/or resizing might be determined by comparing features in corresponding frames to determine their respective locations relative to the edges of the frame, and the necessary transformation to align them. The frames of the reference video may need to be scaled, rotated, or skewed. The accuracy of the aligned images may be computed through techniques such as, for example, root mean square (RMS) error analysis, sum of absolute differences (SAD) analysis, edge analysis, etc.

The reference video and the unauthorized video are temporally aligned (608). This alignment is to ensure that the correct frames of corresponding content fragments are compared and may involve identifying readily distinguishable points in each video such as, for example, a specific frame(s) of a title sequence or opening credits, obvious scene transitions, black frames, dynamic content (e.g., tailored advertisements, pre-roll segments, recommendations, etc.) insertion points, slate frames, etc. Temporal alignment might also involve the combination or removal of frames (e.g., where the reference video has a frame rate of 60 fps and the unauthorized video 30 fps).

Once the reference video and the unauthorized video are temporally aligned, a frame-by-frame comparison for corresponding content fragments is performed to identify a difference between each pair of frames (610). This may be done, for example, by subtracting one from the other. The difference will include noise (e.g., visual artifacts created by an unauthorized image capture device, transcoding artifacts, transformation artifacts, etc.) and, for at least some of the frames of the unauthorized video, the information corresponding to the content fragment version. According to some implementations, if the frame rates of the videos don't match (e.g., the reference video is 60 fps and the unauthorized video is 30 fps) the comparison may be done using only every other frame of the reference video rather than affirmatively removing or combining frames as mentioned above.

In some implementations, the differences obtained by the frame-by-frame comparisons are integrated, summed, or otherwise combined (612) until sufficient information is recovered (614) for the version of a content fragment to be recognized. As mentioned above, the version information, such as an overlay, may be introduced on selected or every frame of the content fragment. The differences with the reference video may then be accumulated over multiple frames of the content fragment to recover the version information, effectively building up the signal based on the recovered signal until the version information emerges from the noise. As will be appreciated, such an approach would be useful for handling signal-to-noise ratio issues and degradation of the signal caused by noisy image capture and/or multiple transformations and transcodings.

It should further be appreciated that the version information may have an associated confidence value. For example, analysis of certain frames within a content fragment may indicate a first version, whereas analysis of other frames within the content fragment may indicate a second version, and the ratio of frames for each version can be used to generate a confidence value.

The version of the content fragment recognized is used to update a version pattern estimate for the unauthorized content (616). For example, the content fragment version being recognized is appended to a sequence of content fragment versions previously identified in a similar manner.

Based on the estimate of the version pattern, which can be the user ID of "1011" as illustrated in FIG. 1, a particular user or device or group of users or devices of the content service can be directly identified as a candidate source of the unauthorized content (620). In some implementations, the estimate of the version pattern is used indirectly to identify a candidate source of the unauthorized content. For example, for anonymization due to privacy concerns, the estimate of the version pattern, "1011," may by itself provide no useful information for identifying a user or device, but is used as an input to a lookup table for a user account, device MAC (Media Access Control) address, and so forth.

In a certain class of implementations, the version pattern estimate is compared to a database of customized manifest data (618). For example, once the version pattern estimate meets certain criteria, such as a minimum length (e.g., for rapid response to unauthorized dissemination of a live event broadcast, etc.) or a maximum length (e.g., total number of content fragments of the media content, etc.), the similarity of the version pattern estimate with entries from a database storing customized manifest data associated with the media content is determined. A probabilistic indication can be provided to account for incorrect detections of a particular content fragment version, partial recovery of a version pattern due to dropped packets, or content fragment mismatches caused by collusion across different users. If the probabilistic values fall below a certain threshold, the version pattern estimate can be further refined by analyzing additional content fragments, or by re-analyzing a particular content fragment with a low confidence value for the version information. The re-analysis can involve adjusting parameters, such as for the modification of the reference content (606) and/or the temporal alignment (608). Based on the similarity analysis between the version pattern estimate and the database of customized manifest data, a particular user or group of users of the content service can be identified as a candidate source of the unauthorized content (620).

It should also be noted that content fragment version information introduced as described herein may be recovered using special filtering techniques to extract the version information from the target video, and such special filtering techniques may be used by themselves or in combination with comparison of the unauthorized content to the reference content.

In a class of implementations, an abridged version of customized manifest data can be used to facilitate version pattern recovery. For example, a database storing all customized manifest data for a particular media content can be analyzed to determine the subset of durations from the entire set of durations for the media content that are used for encoding identifiers for the particular media content. The abridged manifest data indicates which durations to perform comparisons with reference content fragments or to perform image processing on, such as to detect an overlay. By skipping analysis of durations which are not used to encode identifier information, pattern version recovery computation time can be reduced.

Figure 7A:
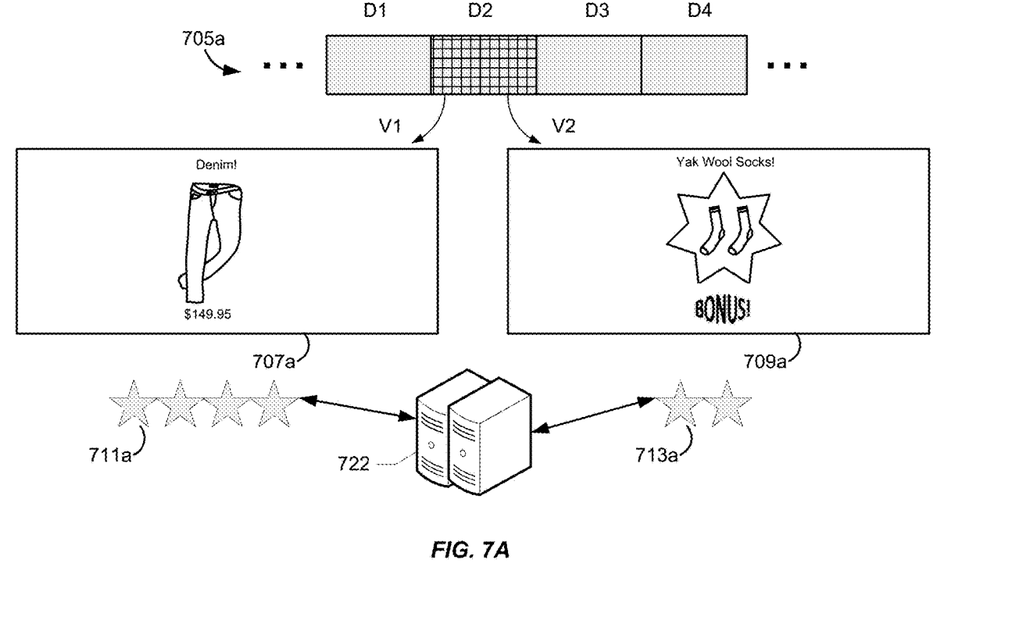
FIG. 7A illustrates an example of identifying media content associated with feedback.

It should be noted that the generation and use of customized manifest data is not limited to anti-piracy applications. FIG. 7A illustrates an example of using customized manifest data to determine the relationship between media content 705a with dynamic content (such as customized advertisements 707a, 709a, pre-rolls, etc.) and user provided feedback. For example, a content service may coordinate with a media player to present an interface for requesting feedback from a user. For a certain group of users (e.g., selected for A/B testing purposes, geo-targeting, etc.), media server 722 can provide customized manifest data including a first version v1 of a content fragment for duration D2 that corresponds to, for example, an advertisement 707a for denim. For other users, customized manifest data corresponds to advertisement 709a for yak wool socks.

Media server 722 receives feedback 711a corresponding to the version of media content 705a with advertisement 707a from a first group of users, and feedback 713a from a second group of users. The feedback indicates a rating, such as four-stars, an identifier for the user providing the feedback, and the media content 705a related to the feedback, but does not indicate if the particular user viewed advertisement 707a or 709a. Media server 722, by using the user identifier provided with the feedback 711a or 713a, can search a database of customized manifest data to determine the version of duration D2 associated with a particular feedback. For example, for A/B testing purposes, media server 722 can compute whether any statistically significant differences in the number of stars in the received feedback is attributable to the different versions of dynamic content corresponding to advertisements 707a or 709a.

It should be noted that the disclosed techniques are applicable to both video-on-demand (VOD) media content streaming and live streaming of an ongoing live event. For example, VOD media content is usually finite in duration, with a definite beginning and end point for its playback. A viewer device on which the VOD media content is to be played back usually requests a manifest file indicating playback options detailing content fragments of the VOD media content available for the entire duration of the playback at different quality levels.

By contrast, the duration of live stream media content can be unknown ahead of time. That is, its end point may be indefinite. As a result, a viewer device on which live stream media content is to be played back might receive several manifest files indicating the playback options detailing the available content fragments of the live stream media content throughout the playback of the live stream. Each of the live streaming manifest files provides the playback options for a short duration.

Customized manifest data can be generated for both VOD streaming or live streaming contexts. For example, a customized manifest can be generated for security and anti-piracy purposes for premium VOD content (e.g., a movie that is no longer being played in theaters, but has not yet been released on Blu-ray, DVD, or is not yet available for rental). As another example, a customized manifest can be generated for live streaming of a live event, such as a live NFL Super Bowl game that is being broadcast worldwide. For instance, manifest data for the same content (i.e., the Super Bowl game) can be dynamically created for particular users to account for business, legal and/or other constraints.

Figure 7B:
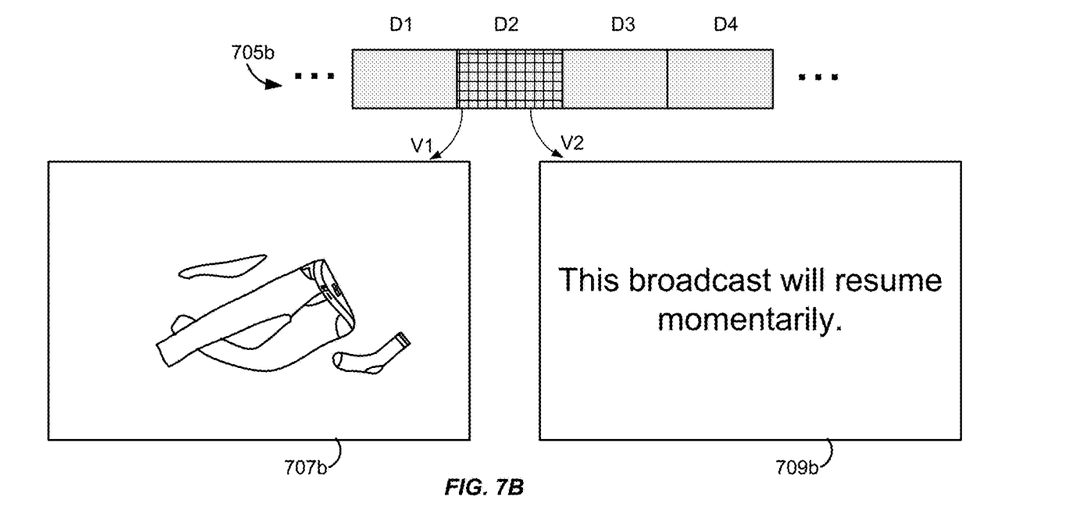
FIG. 7B illustrates an example of generating customized manifest data based on constraints.

FIG. 7B illustrates an example where the media server can receive an automated or manually provided indication that content fragment D2 to be included in the next manifest data refresh for media content 705b requires evaluation of compliance with regulatory requirements (e.g., nudity, graphic violence, tobacco use, etc.). For users in a country with a more restrictive television regulatory regime, the media server generates customized manifest data that only includes a version v2 corresponding to a content fragment 709b displaying, for example, a video frame with an announcement message. In contrast, for a country with a less restrictive television regulatory regime, the media server provides a version v1 corresponding to a content fragment 707b with video frames including mature content.

It should be noted that the term customized manifest data is not limited to the level of specificity corresponding to individual persons or devices as described in the anti-piracy context. For example, for an NFL broadcast scenario, customized manifest data might be a level of specificity based on geography, e.g., all users in a particular television regulatory region receive the same personalization with respect to the particular criteria (i.e., geography). It should be further noted that personalization can occur at multiple levels of specificity. For example, for manifest data customized based on geography, the manifest data for users within the particular geographic area can be further customized based on user behaviors, user preferences, user identity, and other user properties.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A method, comprising:
   receiving credentials from a first client device;
   obtaining, based on the credentials, a first identifier corresponding to the first client device;

receiving a first request for playback of media content, the first request being generated by the first client device;

identifying master manifest data for the media content, the media content corresponding to a plurality of durations, each duration corresponding to a different temporal range of the media content, the master manifest data indicating a first plurality of playback options for each duration, the first plurality of playback options for each of at least some of the durations corresponding to both a first edge server and a second edge server, wherein each of the playback options corresponds to a content fragment, one or more video frames of each of selected ones of the content fragments having a version indicator encoded therein, the version indicator distinguishing between a first version and a second version for a particular content fragment;

encoding the first identifier into first customized manifest data by selecting, for each duration of a first subset of the durations, fewer than all of the first plurality of playback options indicated by the master manifest data for that duration, the selected playback options for each duration of the first subset of the durations corresponding to only one of the first and second edge servers;

providing the first customized manifest data to the first client device;

receiving requests from the first client device corresponding to the durations in the first subset of the durations; and providing, for each duration of the first subset of the durations, either a first version of the corresponding fragment using the first edge server or a second version of the corresponding content fragment using the second edge server based on the version indicator encoded in the first customized manifest data.

2. The method as recited in claim 1, further comprising:

receiving a copy of a version of the media content generated by the first client device using the first customized manifest data, the copy including at least some of the selected content fragments; and determining the first identifier based on the version indicators encoded in the video frames of the selected content fragments.

3. The method of claim 2, wherein the version indicators over the first subset of the durations are representative of the first identifier.

4. The method as recited in claim 3, further comprising selecting the first subset of the durations based on the first identifier.

5. A method, comprising:

receiving a first request for playback of media content, the first request being generated by a first client device;

receiving a first identifier corresponding to the first client device, the first identifier being unrelated to hardware playback capabilities of the first client device;

identifying master manifest data for the media content, the media content corresponding to a plurality of durations, each duration corresponding to a different temporal range of the media content, the master manifest data indicating a first plurality of playback options for each duration, the first plurality of playback options for each of at least some of the durations corresponding to a plurality of edge servers;

encoding the first identifier into first customized manifest data by selecting, for each duration of a first subset of the durations, fewer than all of the first plurality of playback options indicated by the master manifest data for that duration, the selected playback options for each duration of the first subset of the durations corresponding to only one of the edge servers, the selecting being done in a first pattern over the first subset of the durations, the first pattern representing the first identifier; and providing the first customized manifest data to the first client device.

6. The method as recited in claim 5, further comprising selecting the first subset of the durations based on the first identifier.

7. The method as recited in claim 5, further comprising:

receiving a second request for playback of the media content, the second request being generated by a second client device;

receiving a second identifier for the second client device, the first identifier and the second identifier corresponding to different values for a first attribute of the first client device and the second client device;

encoding the second identifier into second customized manifest data by selecting, for each duration of a second subset of the durations, fewer than all of the plurality of playback options indicated by the master manifest data for that duration, the selecting being done in a second pattern over the second subset of durations, the second pattern representing the second identifier.

8. The method as recited in claim 7, wherein the first subset of the durations and the second subset of the durations are the same.

9. The method as recited in claim 5, wherein the first identifier corresponds to one of a geographic location, a user preference, a user behavior, a user identity, or a user account.

10. The method as recited in claim 5, further comprising:

identifying a constraint based on the first identifier, wherein the selecting fewer than all of the playback options for each duration of the first subset of the durations is based in part on the constraint.

11. The method as recited in claim 5, wherein the selecting fewer than all of the playback options for each duration of the first subset of the durations results in playback, by the first client device, of a version of the media content corresponding to the first identifier.

12. The method as recited in claim 5, wherein each of the playback options represented in the first customized manifest data for each duration of the first subset of the durations corresponds to a content fragment, one or more video frames of each of selected ones of the content fragments having a version indicator encoded therein, the version indicators over the first subset of the durations being representative of the first identifier.

13. The method of claim 12, further comprising:

receiving a copy of a version of the media content generated by the first client device using the first customized manifest data, the copy including at least some of the selected content fragments; and determining the first identifier based on the version indicators encoded in the video frames of the selected content fragments.

14. The method as recited in claim 5, further comprising:

receiving feedback on a version of the media content generated by the first client device using the first customized manifest data;

receiving, in conjunction with the feedback, a value corresponding to the first identifier for the first client device; and determining, based on the first customized manifest data, the version of the media content associated with the feedback.

15. A system comprising:
one or more processors and memory configured to:
  receive a first request for playback of media content, the first request being generated by a first client device;
  receive a first identifier corresponding to the first client device, the first identifier being unrelated to hardware playback capabilities of the first client device;
  identify master manifest data for the media content, the media content corresponding to a plurality of durations, each duration corresponding to a different temporal range of the media content, the master manifest data indicating a first plurality of playback options for each duration, the first plurality of playback options for each of at least some of the durations corresponding to a plurality of edge servers;
  encode the first identifier into first customized manifest data by selecting, for each duration of a first subset of the durations, fewer than all of the first plurality of playback options indicated by the master manifest data for that duration, the selected playback options for each duration of the first subset of the durations corresponding to only one of the edge servers, the selecting being done in a first pattern over the first subset of the durations, the first pattern representing the first identifier; and
  provide the first customized manifest data to the first client device.

16. The system as recited in claim 15, the one or more processors and memory further configured to select the first subset of the durations based on the first identifier.

17. The system as recited in claim 15, the one or more processors and memory further configured to:
  receive a second request for playback of the media content, the second request being generated by a second client device;
  receive a second identifier for the second client device, the first identifier and the second identifier corresponding to different values for a first attribute of the first client device and the second client device;
  encode the second identifier into second customized manifest data by selecting, for each duration of a second subset of the durations, fewer than all of the plurality of playback options indicated by the master manifest data for that duration, the selecting being done in a second pattern over the second subset of durations, the second pattern representing the second identifier.

18. The system as recited in claim 17, wherein the first subset of the durations and the second subset of the durations are the same.

19. The system as recited in claim 15, wherein the first identifier corresponds to one of a geographic location, a user preference, a user behavior, a user identity, or a user account.

20. The system as recited in claim 15, the one or more processors and memory further configured to:
  identify a constraint based on the first identifier, wherein the selecting fewer than all of the playback options for each duration of the first subset of the durations is based in part on the constraint.

21. The system as recited in claim 15, wherein the selecting fewer than all of the playback options for each duration of the first subset of the durations results in playback, by the first client device, of a version of the media content corresponding to the first identifier.

22. The system as recited in claim 15, wherein each of the playback options represented in the first customized manifest data for each duration of the first subset of the durations corresponds to a content fragment, one or more video frames of each of selected ones of the content fragments having a version indicator encoded therein, the version indicators over the first subset of the durations being representative of the first identifier.

23. The system of claim 22, the one or more processors and memory further configured to:
  receive a copy of a version of the media content generated by the first client device using the first customized manifest data, the copy including at least some of the selected content fragments; and
  determine the first identifier based on the version indicators encoded in the video frames of the content fragments.

24. The system as recited in claim 15, the one or more processors and memory further configured to:
  receive feedback on a version of the media content generated by the first client device using the first customized manifest data;
  receive, in conjunction with the feedback, a value corresponding to the first identifier for the first client device; and
  determine, based on the first customized manifest data, the version of the media content associated with the feedback.

* * * * *